US012646337B2

(12) United States Patent
Aguilar et al.

(10) Patent No.: US 12,646,337 B2
(45) Date of Patent: Jun. 2, 2026

(54) TECHNOLOGY CONFIGURED TO ENABLE FAULT DETECTION AND CONDITION ASSESSMENT OF UNDERGROUND STORMWATER AND SEWER PIPES

(71) Applicant: Vapar PTY LTD, Queenscliff (AU)

(72) Inventors: Michelle Aguilar, Queenscliff (AU); Amanda Siqueira, Queenscliff (AU)

(73) Assignee: VAPAR PTY LTD, Queensland (AU)

( * ) Notice: Subject to any disclaimer, the term of this patent is extended or adjusted under 35 U.S.C. 154(b) by 684 days.

(21) Appl. No.: 17/906,028

(22) PCT Filed: Aug. 4, 2020

(86) PCT No.: PCT/AU2020/050802
§ 371 (c)(1),
(2) Date: Sep. 9, 2022

(87) PCT Pub. No.: WO2021/179033
PCT Pub. Date: Sep. 16, 2021

(65) Prior Publication Data
US 2023/0101112 A1     Mar. 30, 2023

(30) Foreign Application Priority Data

Mar. 9, 2020    (AU) ................................. 2020900724

(51) Int. Cl.
*G06K 9/00*          (2022.01)
*G01N 21/88*         (2006.01)
(Continued)

(52) U.S. Cl.
CPC ......... *G06V 20/60* (2022.01); *G01N 21/8851* (2013.01); *G01N 21/954* (2013.01);
(Continued)

(58) Field of Classification Search
CPC .............................. G01N 21/954; G06V 10/82
See application file for complete search history.

(56) References Cited

U.S. PATENT DOCUMENTS 7,215,811 B2     5/2007   Moselhi et al.
10,417,524 B2     9/2019   Feng et al.
(Continued)

FOREIGN PATENT DOCUMENTS

| CN | 109767422 A | * | 5/2019 | |
| GB | 2542118 A | | 3/2017 | |
| KR | 102008973 B1 | * | 8/2019 | ........... G06T 7/0004 |

OTHER PUBLICATIONS

Halfawy, M. R., & Hengmeechai, J. (2014). Optical flow techniques for estimation of camera motion parameters in sewer closed circuit television inspection videos. Automation in construction, 38, 39-45. (Year: 2014).*

(Continued)

*Primary Examiner* — Molly Wilburn
*Assistant Examiner* — Aidan Keup
(74) *Attorney, Agent, or Firm* — TraskBritt

(57) ABSTRACT
The present disclosure relates to technology configured to enable fault detection and condition assessment of underground stormwater and sewer pipes. Embodiments of the present disclosure have been developed to allow automated processing of video captured by pipe inspection robots and the like thereby to identify and categorize artefacts in pipes.

31 Claims, 11 Drawing Sheets

(51) Int. Cl.
 *G01N 21/954*   (2006.01)
 *G06V 10/82*   (2022.01)
 *G06V 20/60*   (2022.01)

(52) U.S. Cl.
 CPC ..... *G06V 10/82* (2022.01); *G01N 2021/8864* (2013.01); *G01N 2021/8887* (2013.01); *G01N 2021/9548* (2013.01)

(56)      References Cited

U.S. PATENT DOCUMENTS

| | | | |
|---|---|---|---|
| 2017/0323163 | A1 | 11/2017 | Leung |
| 2019/0139215 | A1 | 5/2019 | Starr et al. |
| 2020/0050923 | A1* | 2/2020 | Patney ...................... G06T 5/60 |
| 2020/0348183 | A1* | 11/2020 | Agarwal ................... G01J 5/12 |
| 2021/0082098 | A1* | 3/2021 | Kumbhare ............ G06T 7/0004 |

OTHER PUBLICATIONS

Ma, K., Schirru, M., Zahraee, . . . & Anderson, S. R. (Jul. 2017). PipeSLAM: Simultaneous localisation and mapping in feature sparse water pipes using the Rao-Blackwellised particle filter. In 2017 IEEE international conference on advanced intelligent mechatronics (AIM) (pp. 1459-1464). IEEE. (Year: 2017).*

Feng et al., Deep Active learning for Civil Infrastructure Defect Detection and Classification, Mitsubishi Electric Research laboratories, http://www.merl.com, published Jun. 2017.

International Search Report for International Application No. PCT/AU2020/050802 dated Nov. 5, 2020, 6 pages.

International Written Opinion for International Application No. PCT/AU2020/050802 dated Nov. 5, 2020, 10 pages.

* cited by examiner

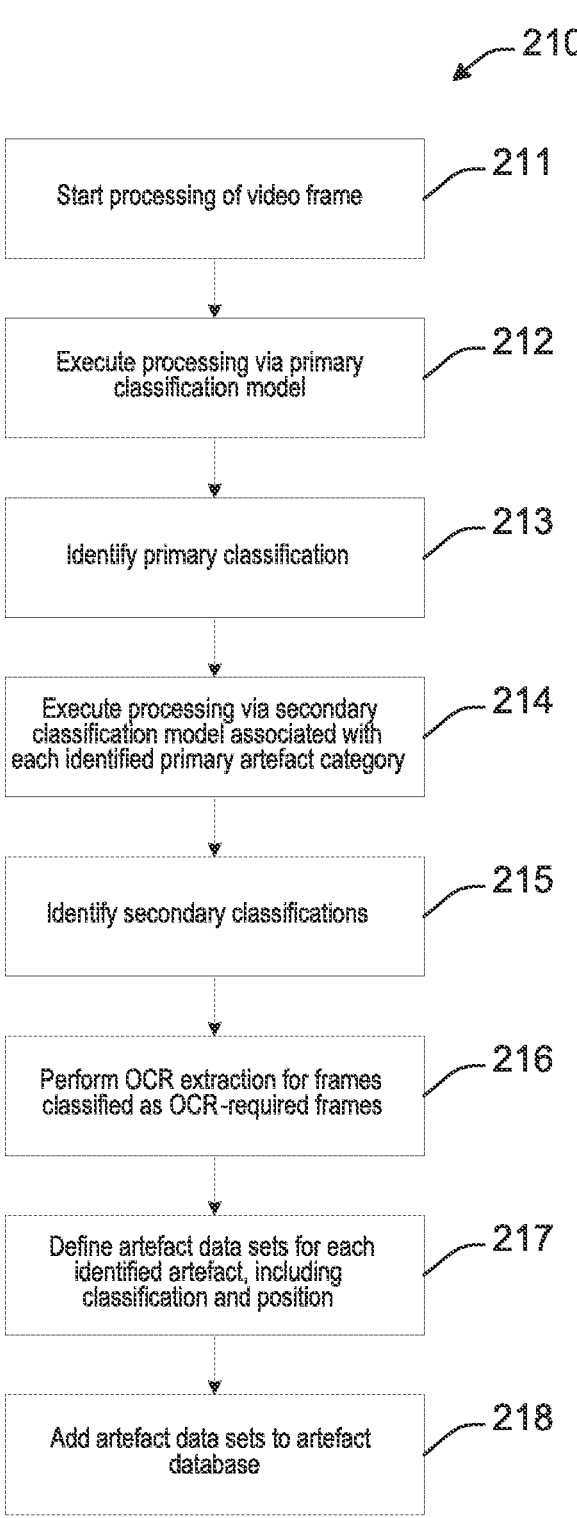

210

Start processing of video frame — 211

Execute processing via primary classification model — 212

Identify primary classification — 213

Execute processing via secondary classification model associated with each identified primary artefact category — 214

Identify secondary classifications — 215

Perform OCR extraction for frames classified as OCR-required frames — 216

Define artefact data sets for each identified artefact, including classification and position — 217

Add artefact data sets to artefact database — 218

FIG. 2B

TECHNOLOGY CONFIGURED TO ENABLE FAULT DETECTION AND CONDITION ASSESSMENT OF UNDERGROUND STORMWATER AND SEWER PIPES

CROSS-REFERENCE TO RELATED APPLICATIONS

This application is a national phase entry under 35 U.S.C. § 371 of International Patent Application PCT/AU2020/050802, filed Aug. 4, 2020, designating the United States of America and published as International Patent Publication WO 2021/179033 A1 on Sep. 16, 2021, which claims the benefit under Article 8 of the Patent Cooperation Treaty to Australian Patent Application Serial No. 2020900724, filed Mar. 9, 2020.

TECHNICAL FIELD

The present disclosure relates to technology configured to enable fault detection and condition assessment of underground stormwater and sewer pipes. Embodiments of the present disclosure have been developed to allow automated processing of video captured by pipe inspection robots (and the like) thereby to identify and categorize artefacts in pipes. While some embodiments will be described herein with particular reference to those applications, it will be appreciated that the present disclosure is not limited to such a field of use, and is applicable in broader contexts.

BACKGROUND

Any discussion of the background art throughout the specification should in no way be considered as an admission that such art is widely known or forms part of common general knowledge in the field.

It is known to utilize pipe inspection robots and the like to obtain video footage from within stormwater and sewer pipes. Video footage is then manually reviewed to identify issues, for example, obstructions, cracks, and the like. This is currently a time-consuming manual process.

BRIEF SUMMARY

It is an object of the present disclosure to overcome or ameliorate at least one of the disadvantages of the prior art, or to provide a useful alternative.

Example embodiments are described below in the section entitled "claims."

One embodiment provides a computer implemented method configured to enable analysis of pipe infrastructure, the method including:

receiving input video data defining a pipe inspection video collected via pipe inspection infrastructure for a defined pipe at a defined location;

for each frame in a subset of frames defined in the video data:

(i) processing the frame via one or more image classification models, thereby to identify presence of one or more artefacts belonging to a defined set of pipe condition artefact classifications;

(ii) determining position data associated with the frame;

(iii) defining, for each identified artefact, an artefact data set representative of a combination of a position and an artefact classification;

executing a duplication identification process configured to identify artefact data sets having combinations of position and an artefact classification from distinct frames that are predicted to represent a common real-world artefact in the pipe; and outputting pipe condition data derived from the deduplicated artefact data.

One embodiment provides a method wherein the subset of frames is defined by a sampling of frames at a rate of between 1 and 5 frames per second.

One embodiment provides a method wherein processing the frame via one or more image classification modules, thereby to identify presence of one or more pipe condition artefacts belonging to a defined set of pipe condition artefact classifications includes:

(i) processing the frame via a primary classification model, thereby to identify one or more artefact categories; and (ii) for each identified artefact category having an associated secondary classification model, executing the associated secondary classification model thereby to determine an artefact classification.

One embodiment provides a method including, for each identified artefact category without an associated secondary classification model, determining an artefact classification based on the primary classification module.

One embodiment provides a method wherein the defined set of pipe condition artefact classifications includes one or more pipe condition artefact classifications associated with an OCR extraction trigger, and wherein for each identified artefact having a classification associated with the OCR extraction trigger, the method includes performing an OCR extraction of text data from the video frame.

One embodiment provides a method wherein the text data includes a positional measurement.

One embodiment provides a method wherein the positional measurement is used to determine the positioning data associated with the frame.

One embodiment provides a method wherein the text data includes data describing the defined pipe and/or pipe location.

One embodiment provides a method including extracting positional measurement data from a data file associated with the video data, wherein the data file associates video timecodes and/or frames with positional data.

One embodiment provides a method wherein the duplication identification process configured to identify combinations of position and an artefact classification from distinct frames that are predicted to represent a common real-world artefact in the pipe includes:

(i) sorting artefact data sets based on their positional information; and (ii) identifying as duplicates artefact data sets having (A) a common artefact classification; and (B) positional information within a threshold range.

One embodiment provides a method wherein the duplication identification process configured to identify combinations of position and an artefact classification from distinct frames that are predicted to represent a common real-world artefact in the pipe includes:

(i) sorting artefact data sets based on their positional information;

(ii) segregating the artefact data set into blocks of a predefined distance based on the positional information; and

3

(iii) identifying as duplicates artefact data sets having (A) a common artefact classification; and (B) segregation into a common block.

One embodiment provides a method wherein the predefined distance is between 100 mm and 500 mm.

One embodiment provides a method wherein the predefined distance is defined relative to the diameter of the pipe.

One embodiment provides a method wherein the duplication identification process includes a frame-to-frame comparison process that uses: (i) image similarity; (ii) relative capture positions; and (iii) artefact classification data for each frame.

One embodiment provides a method wherein the image similarity uses a structural similarity (SSIM) comparison process.

One embodiment provides a method wherein the frame-to-frame comparison process uses a trained machine learning model.

One embodiment provides a method including enabling accessing by a user of a user interface that is configured to enable a user to manually review and adjust artefact classifications by reference to display of relevant video frames.

One embodiment provides a method including outputting reporting data for the pipe in accordance with a predefined reporting standard.

One embodiment provides a method wherein determining position data associated with a given frame includes performing an OCR extraction of position data superimposed on the frame.

One embodiment provides a method wherein the position data is a relative position based on a start point.

One embodiment provides a method wherein determining position data associated with a given frame includes performing a simultaneous location and mapping (SLAM) process.

One embodiment provides a method wherein determining position data associated with a given frame includes performing a position tracking process based on image processing techniques.

One embodiment provides a method wherein determining position data associated with a given frame includes performing a position tracking process based on an optical flow method.

One embodiment provides a method for determining water levels in a pipe, the method including:

receiving input video data defining a pipe inspection video collected via pipe inspection infrastructure for a defined pipe at a defined location;

for each frame in a subset of frames defined in the video data, processing the frame via a computer vision technique thereby to identify a pipe joint; and for each joint identified in the pipe: determining a water level at the joint.

One embodiment provides a method wherein the processing the frame via a computer vision technique thereby to identify a pipe joint includes applying a computer vision technique configured to identify partial circles.

One embodiment provides a method wherein the computer vision technique configured to identify partial circles includes a Hough transform.

One embodiment provides a method wherein identifying water level at the joint is based upon analysis of attributes of the partial circle.

One embodiment provides a method wherein identifying water level at the joint is based upon analysis of a height of the pipe for which the joint is not visible.

One embodiment provides a method wherein identifying water level at the joint is based upon analysis of a comparison between width of the identified partial circle and height of the identified partial circle, with the difference between width and height representing a height defining predicted water level.

One embodiment provides a method including applying a deduplication process thereby to identify frames showing common joints thereby to enable identification of unique joints.

One embodiment provides a method wherein the deduplication process includes an image similarity comparison process.

One embodiment provides a method including additional steps of performing a method of any one of claims 22 to 29.

Reference throughout this specification to "one embodiment," "some embodiments" or "an embodiment" means that a particular feature, structure or characteristic described in connection with the embodiment is included in at least one embodiment of the present disclosure. Thus, appearances of the phrases "in one embodiment," "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or that comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the present disclosure will now be described, by way of example only, with reference to the accompanying drawings in which:

FIG. 2B illustrates a method according to one embodiment.

DETAILED DESCRIPTION

Figure 1:
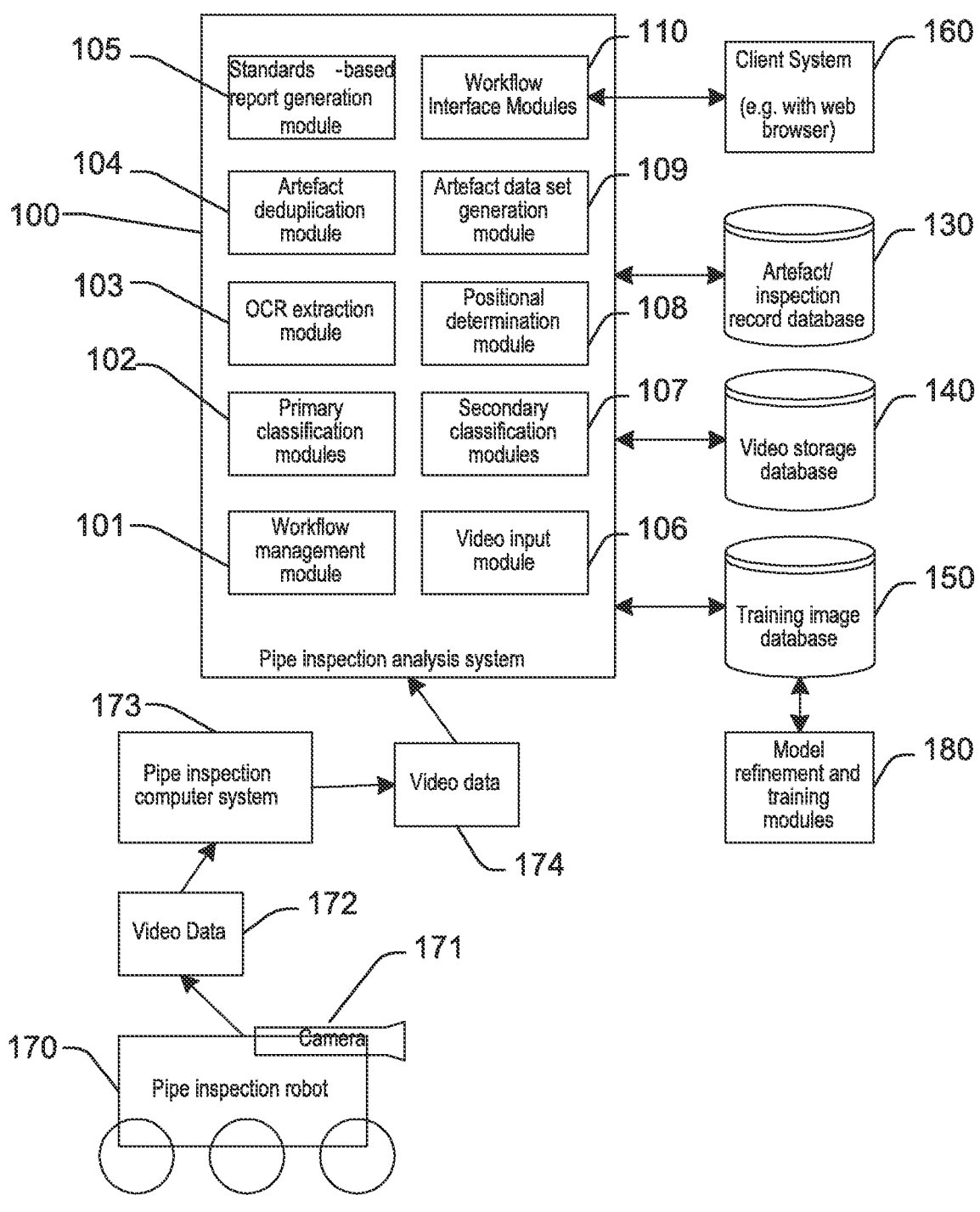
FIG. 1 provides a representation of a technology framework according to one embodiment.

The present disclosure relates to technology configured to enable fault detection and condition assessment of underground stormwater and sewer pipes. Embodiments of the present disclosure have been developed to allow automated processing of video captured by pipe inspection robots and the like thereby to identify and categorize artefacts in pipes. While some embodiments will be described herein with particular reference to those applications, it will be appreciated that the present disclosure is not limited to such a field of use, and is applicable in broader contexts.

Overview

Embodiments described below relate to allowing automated processing of video captured by pipe inspection robots and the like thereby to identify and categorize artefacts in pipes, for example, in the context of fault detection and condition assessment.

Embodiments include computer implemented methods configured to enable analysis of pipe infrastructure. Example methods include receiving input video data defining a pipe inspection video. This video is collected via pipe inspection infrastructure (for example, a pipe inspection robot) for a defined pipe at a defined location. The defined pipe and location may be defined in metadata associated with the video data, but is more customarily defined as a text-based overlay applied to the video data (in which case that information may be extracted via an OCR method), for example, as a chainage measurement (distance from manhole, which is in some cases measured by way of a tether that extends from a pipe inspection robot).

The video is typically conventional aspect ratio video (for example, captured at an aspect ratio of 4:3 or 16:9). However, in some embodiments, 360° video may be used (for example, 180° or 360° spherical videos). In some such embodiments, a pre-processing method may be applied thereby to convert a 180° or 360° spherical video into a conventional aspect ratio, for example, a process that is used to normalize 360° video based on a defined view direction along the pipe (thereby to in effect mimic a conventional pipe inspection video). In further embodiments, the video input may be defined based on a computer process that extracts a virtual pipe inspection video from a 3D model of a pipe, wherein the 3D model is generated via image capture and processing techniques based on data captured via a pipe inspection robot (for example, using photogrammetry techniques and the like).

The method includes processing each frame in a subset of frames defined in the video data. For example, this subset may be defined as a sampling between one and five frames per second (although a higher or lower frequency of sampling may be used, noting that a higher frequency requires additional processing resources). In some embodiments, the subset is defined by all of the frames. The processing includes, for each frame:

(i) Processing the frame via one or more image classification models, thereby to identify presence of one or more artefacts belonging to a defined set of pipe condition artefact classifications. The models may include Convolutional Neural Networks (CNN) type models that operate on the basis of training from manually labelled images. In a preferred embodiment, the model provides a score (for example, a percentage) defining a confidence that the frame includes a given artefact (for example, a crack in a pipe). The one or more image classification models are tiered, in some embodiments, with a primary model configured to perform a high level classification, and multiple secondary models for more granular classification of frames classified to respective ones of a subset of the high level classifications.

(ii) Determining position data associated with the frame. It is customary (and in some cases mandated by standards) for pipe inspection videos to include an overlay representative of position (for example, based on operation of a pipe inspection robot that tracks its movement forward and backwards, referred to in some cases as a chainage measurement, which is representative of distance from a defined manhole), and determining the position data may be based on OCR extraction of that overlay. However, other methods including simultaneous location and mapping (SLAM) and/or image-based motion/positional determination may be used. Further embodiments make use of technologies including GPS and/or network-assisted triangulation.

(iii) Defining, for each identified artefact, an artefact data set representative of a combination of a position and an artefact classification. For example: a frame "Frame A" is classified by a primary model as "artefact X"; the frame is passed to a secondary model for increased granularity of classifications under "artefact X" and classified as "Artefact X, Type Y"; a chainage measurement overlay is identified in the frame, and OCR extraction of that measurement is "Z meters," then the artefact data set is defined by: "Frame A," "Artefact X, Type Y," "Z meters."

The method also includes executing a duplication identification process configured to identify artefact data sets having combinations of position and an artefact classification from distinct frames that are predicted to represent a common real-world artefact in the pipe. Example duplication identification processes are described further below.

The method also includes outputting pipe condition data derived from the deduplicated artefact data. This may include: (i) outputting via a user interface that allows manual review and adjustment/approval of automated classifications; and (ii) outputting of a report for a pipe in a standardized format (for example, in Australia the standardized format may be based on the WSA-05-2008 Conduit Inspection Reporting Code), or a newer version thereof that is released following filing of this specification.

Example Technology Framework

FIG. 1 illustrates an example framework according to one embodiment, functionally illustrating various hardware and software elements. Software is described herein by reference to a plurality or "modules." The term "module" refers to a software component that is logically separable (a computer program), or a hardware component. The module of the embodiment refers to not only a module in the computer program but also a module in a hardware configuration. The discussion of the embodiment also serves as the discussion of computer programs for causing the modules to function (including a program that causes a computer to execute each step, a program that causes the computer to function as means, and a program that causes the computer to implement each function), and as the discussion of a system and a method. For convenience of explanation, the phrases "stores information," "causes information to be stored," and other phrases equivalent thereto are used. If the embodiment is a computer program, these phrases are intended to express "causes a memory device to store information" or "controls a memory device to cause the memory device to store information." The modules may correspond to the functions in a one-to-one correspondence. In a software implementation, one module may form one program or multiple modules may form one program. One module may form multiple programs. Multiple modules may be executed by a single computer. A single module may be executed by multiple computers in a distributed environment or a parallel environment. One module may include another module. In the discussion that follows, the term "connection" refers to not only a physical connection but also a logical connection (such as an exchange of data, instructions, and data reference relationship). The term "predetermined" means that something is decided in advance of a process of interest. The term "predetermined" is thus intended to refer to something that is decided in advance of a process of interest in the embodiment. Even after a process in the embodiment has started, the term "predetermined" refers to something that is decided in advance of a process of interest depending on a condition or a status of the embodiment at the present point of time or depending on a condition or status heretofore continuing down to the present point of time. If "predetermined values" are plural, the predetermined values may be different from each other, or two or more of the predetermined values (including all the values) may be equal to each other. A statement that "if A, B is to be performed" is intended to mean "that it is determined whether something is A, and that if something is determined as A, an action B is to be carried out." The statement becomes meaningless if the determination as to whether something is A is not performed.

The term "system" refers to an arrangement where multiple computers, hardware configurations, and devices are interconnected via a communication network (including a one-to-one communication connection). The term "system," and the term "device," also refer to an arrangement that includes a single computer, a hardware configuration, and a device. The system does not include a social system that is a social "arrangement" formulated by humans.

At each process performed by a module, or at one of the processes performed by a module, information as a process target is read from a memory device, the information is then processed, and the process results are written onto the memory device. A description related to the reading of the information from the memory device prior to the process and the writing of the processed information onto the memory device subsequent to the process may be omitted as appropriate. The memory devices may include a hard disk, a random-access memory (RAM), an external storage medium, a memory device connected via a communication network, and a ledger within a CPU (Central Processing Unit).

In the example of FIG. 1, a pipe inspection robot 170 is fitted with a camera 171 and other sensors (not shown), including positioning sensors (which typically measure forward/backwards movement of the robot via a cable reel and/or wheel sensor), thereby to record a chainage measurement representative of distance from a defined manhole, as GPS technology is unsuited to underground environments. Robot 170 is placed into a known pipe at a known location, and controlled to capture video data 172 within the pipe in a known area. For example, this may include forward movements and rearward movements, along with tilt/pan operations of the camera. Data associated with the recoding is collected. This, in some embodiments, includes the pipe location (and other identifying features of the pipe, for example, pipe type, assed identifier and the like), start point, robot position relative to start point, and in some instances camera direction relative to normal. This data associated with the recording is, in some embodiments, associated with video data 172 via operation of robot 170, and in some embodiments, associated with video data 174 based on an intermediate operation of software executing at a pipe inspection computer system 173. The association may be via metadata, which associates a video file and individual frames with metadata. However, a more conventional approach in the industry is to overlay the associated data as a textual overlay on the video data. This typically includes: (i) one or more commencement overlays that provide comprehensive information about the pipe inspection that was conducted, overlaid on several seconds of frames at or proximal the start of the video; and (ii) dynamic persistent overlays that provide dynamic information relating to position and time. Techniques by which video data is overlays are generated will be well known by those familiar with common video-based pipe inspection techniques.

In some embodiments, rather than video overlays, alternate technologies are used to provide frame-specific information. This, in some embodiments, includes the use of a computer file (for example, a text file) that associates video frames and/or timecodes with metadata. For example, a text file associates timecodes with chainage measurements.

Conventionally, video data 172 or video data 174 (these may be the same, or different by virtue of optional operations performed via software at a pipe inspection computer system 173) is watched and manually reviewed by a skilled inspection technician, who identifies faults in a pipe and performs a conditions assessment, typically in compliance with a predefined standard (for example, in Australia the standardized format may be based on the WSA-05-2008 or WSA-05-2013 Conduit Inspection Reporting Code). This allows for the production of a pipe inspection report, or a newer version thereof that is released following filing of this specification. Any reference herein to standards should be taken to include both current and future standards.

In the framework of FIG. 1, video data 174 is transmitted from pipe inspection computer system 173 (for example, PC downloads operated by pipe inspection contractor) to a pipe inspection analysis system 100. This may be achieved via a range of technologies, including by way of example the following:

Transmission of one or more video files via email, FTP, or other file transfer service.

Accessing a website via computer system 173, wherein that website provides a user interface by which a user is enabled to login to a user account and select videos for upload. In some embodiments, the user is enabled to input metadata to accompany video files, and/or review automatedly defined metadata for those files (for example, metadata defined via OCR extraction of information provided in a frame overlay). Delivery via physical recoding media (for example, flash memory, CD ROM, etc.).

Transfer of data via an API that integrates software executing at a host system with system 173, thereby to enable transmission of video files and the like. In some embodiments, communication from system 173, for example, output of data relating to pipe inspections for presentation via software that displays asset data, for example, via a Geographic Information Systems (GIS) interface.

Video data may be segregated into separate files based on individual pipes/inspection, or may be composite files that are able to be split out into individual pipes/inspections via identification of delimiters (for example, graphically identifiable delimiters).

System 100 receives video data 174 via a video input module 106. Video input module 106 is configured to store the video data in a video storage database 140. System 100 is configured to perform operations on database 140 thereby to associate database records containing video files with additional associated data, for example, data relating to the sender of the video file, and data defined via processing of the video files as described further below.

Receipt of a new video file via module 106 directly or indirectly triggers a workflow process for that video file. The workflow process is managed by a workflow management module 101. In overview, this workflow manages a process by which a video file is stored, processed to extract information regarding the pipe (including fault and condition information), review extracted information, and generate a pipe assessment report. Examples related to this process are described in detail below.

In the example of FIG. 1, system 100 includes primary classification modules 102, which are configured to execute one or more primary image artefact classification models (for example, using convolutional neural networks for image classification), and secondary classification modules 107, which are configured to execute a set of secondary artefact classification modules (again optionally using convolutional neural networks for image classification), with the secondary models being selected based on output from the primary model(s).

The primary and secondary models are trained and refined using labelled images, for example, manually reviewed and labelled images processed via model refinement and training modules 180 and a training image database 150. Various AI-based image classification technologies are known and may be used, for example, by using convolutional neural networks and other approaches. Those skilled in the art will be familiar with the process of model training and refinement.

In this example, the primary and secondary models are trained based on the WSA-05 code. In other examples, alternate pipe assessment standards may be used as an alternative. In some examples, rather than using an independently defined standard, a proprietary standard is defined, along with a mapping protocol between that proprietary standard and one or more independently defined standard (this allowing the models to provide reports in accordance with those standards). It will be appreciated that such a mapping protocol may also be defined based on the WSA-05 standard thereby to allow the system of FIG. 1 to provide reports based on standards other than WSA-05. In some embodiments, secondary models are trained thereby to enable artefact detection for specific standards in addition to WSA-05, for example, UK standard MSCC and the US standard PACP.

Videos uploaded to system 100 are broken down into frames, and these frames are passed to the primary classification module. This may be all video frames, or a sampled subset of video frames (for example, between one and five frames per second). It will be appreciated that a lower sampling reduces the amount of processing required, and improves time efficiency. However, that factor might be insignificant in certain circumstances, in which case all frames may be processed.

Primary classification modules 102 are configured to process frames via a primary CNN model that is trained on high level classes defined in the WSA-05 code (or another code). In one example, models are trained for both stormwater pipes and sewer pipes, and the classifications include the following main classifications:

Breaking
Connection or Junction
Cracking
Debris or Deposits
Deformation
Infiltration
Joint_displacement
Lifting holes
Liners
Obstruction (Sewer primary model only)
Roots
Surface_damage The classifications also include the following, referred to as "non-tiered classifications":

Collapse
Change of conduit material
Line of conduit deviates
Loss_of_vision
No_defect
Other or Unknown
Seal ring intruding
Start_or_End_Node
Textbox
Title At a practical level, the difference between the main classification and the non-tiered classifications is that each of the main classifications has an associated secondary model (or "sub model"). After each frame is classified by the main model, it is passed to the corresponding sub-model (if one exists) that makes the following classifications:

Breaking
    Displaced_Large
    Displaced_Medium
    Displaced_Small
    Missing_Large
    Missing_Medium
    Missing_Small
Connection or Junction
    Blocked
    Damaged
    Intruding connection_Large
    Intruding connection_Small
    No_defect
Cracking
    Circ_large
    Circ_small
    Long_large
    Long_small
    Mult_large
    Mult_small
Debris & Obstructions
    10_to_20
    30_to_50
    60_to_70
    80_to_100
    Intruding_objects Deformation
  Large
  Medium
  Small
Displaced Joint
  Offset_large
  Offset medium
  Offset_small
  Separated_large
  Separated_medium
  Separated_small
  Angular_large
  Angular_medium
  Angular_Small
Infiltration
  Infiltration_Dripping
  Infiltration_Gushing
  Infiltration_Running
  Infiltration_Seeping
Lifting holes
  Lifting_hole_damaged
  Lifting_hole_nodefect
Liners
  Blistered
  Bulge
  Defective connection
  Displaced joint
  Healthy liner
  Infiltration
  Peeling
  Pinhole
  Roots
  Wrinkled
Roots
  Small
  Mass 0 to 10
  Mass 10_to_20
  Mass_Medium
  Mass 30 to 40
  Mass_Large
  Tap_roots
Surface Damage
  Agg_exposed
  Corrosion
  Reo_exposed
  Reo_visible
  Spalling For non-tiered classifications, there is no sub model. In the case of some non-tiered classification (for example, title), an OCR process is triggered thereby to extract textual information, and this textual information is processed via a defined protocol thereby to enable population of defined data fields (for example, thereby to provide metadata describing the pipe location and/or ID, date, time, and so on).

In one embodiment, a material detection deep learning model configured to identify pipe material, for example: Clay, Concrete, Plastic or Other. This is run on one or more selected frames, for example, the first "No defect" frame found in a given video file.

As noted above, the processing includes, for each frame:
(i) Processing the frame via one or more image classification models, thereby to identify presence of one or more artefacts belonging to a defined set of pipe condition artefact classifications. In this example, for both the primary and secondary classification models, the system is configured to take a highest % certainty as the classification. If the primary model certainty % is too low, the system classifies the frame as "Unknown."
(ii) Determining position data associated with the frame. In this example, this is achieved by identifying a video overlay that provides a chainage (distance from manhole) measurement, and this is extracted from the frame using OCR by a positional determination module 108.
(iii) Defining, for each identified artefact, an artefact data set representative of a combination of a position and an artefact classification, via an artefact data set generation module 109.

As a result of this processing, for given video data 174, a data set is defined that includes for each frame artefact classification data and position data. This is stored in an artefact/inspection record database 130 (in some embodiments, databases 130 and 140 are combined). This is referred to as a "master classified artefact set" for the video file.

Although the examples herein focus on positional determination module 108 using OCR extraction of chainage measurements to determine position, other technologies may be used as alternatives or in combination. These include:
  Performing a simultaneous location and mapping (SLAM) process. SLAM methods will be understood by those skilled in the art.
  Performing an optical flow process, for example, analyzing a pattern of apparent motion of objects, surfaces, and edges in a visual scene caused by the relative motion between an observer and the scene.
  Performing another movement detection process based on image processing, for example, identifying inter-frame movement of identified artefacts or points.
  GPS or local triangulation (for example, Wi-Fi or cellular network enabled triangulation).
  Timestamped movement data provided via a separate file, for example, a text file or CSV file.

In some embodiments, only linear or pipe-direction fore/aft movements are considered. In other embodiments, camera direction (e.g., vertical/horizontal tilt) are also factored in for the purposes of positional determinations.

Following generation of the master classified artefact set, workflow management module 101 triggers an artefact deduplication process via an artefact deduplication module 104. Example deduplication processes include:
  A process including (i) sorting artefact data sets based on their positional information; and (ii) identifying as duplicates artefact data sets having (A) a common artefact classification; and (B) positional information within a threshold range.
  A process including (i) sorting artefact data sets based on their positional information; (ii) segregating the artefact data set into blocks of a predefined distance (for example, between 100 mm and 500 mm, preferably about 300 mm) based on the positional information; and (iii) identifying as duplicates artefact data sets having (A) a common artefact classification; and (B) segregation into a common block.

In the example above, the blocks may be defined in an overlapping or separated manner. For example, where overlapping blocks are defined, for each frame having position X, a block is defined a distance Y in front of X and Z behind X.

By such approaches, which reorder artefact data sets by position, deduplication is able to be performed more accurately than deduplication based on frame order and/or timecodes, given that an inspection robot may move forward and backward, and at varying speeds, over the course of an inspection.

Following deduplication, classification data sets for a given pipe inspection video are made available for a manual review. In the example of FIG. 1, workflow interface modules 110 enable accessing of artefact data sets via graphical user interface rendered via a web browser application at a client system 160. It will be appreciated that a range of technologies may be used to provide a user with access to graphical user interface that presents details of a collection of artefact data sets for a given pipe inspection, thereby to allow manual review of artefact classifications. An example user interface is described further below by reference to FIG. 3.

Following manual review, a standards-based report generation module 105 enables outputting of reporting data for the pipe in accordance with a predefined reporting standard (for example, WSA-05, or another protocol that may be mapped directly or indirectly to WSA-05). The report may be, for example, exported in PDF format or the like. In some embodiments, the workflow interface modules 110 allow for viewing of available reports and other pipe assessment information via a map-based interface that enables identification and selection of pipes based on geographical location.

In some embodiments, the system is configured to operate in respect of both sewer pipes and stormwater pipes. These different forms of pipes may have different sets of primary and secondary models, and different underlying logic for generation of report data. In such cases, a preliminary step is preferably performed thereby to identify a pipe type (for example, "sewer" or "stormwater.") Examples of how that is optionally performed are described below.

In some embodiments, each user account that is authorized to upload video data has an associated "pipe type" identifier, based on that user account only uploading a particular pipe type. For instance, it is customary that some organizations only inspect sewer pipes, and others only inspect stormwater pipes.

In some embodiments, a given organization is provided with two user accounts that are respectively authorized to upload video data has an associated "pipe type" identifier, one for sewer and one for stormwater.

In some embodiments, an AI classifier model is configured to identify a pipe material via image processing techniques, and this allows for determination of whether a pipe is a sewer or stormwater pipe. Other visual artefacts may also be used (for example, training a model based on labelled images of stormwater pipes and sewer pipes, and/or training a model to identify artefacts that are uniquely present in pipes of a particular type).

In some embodiments, a pipe type (or material) is extracted from OCR information of a title overlay, and this is used to determine pipe type. For example, this may be extracted from a "Usage" of the pipe (i.e., may include text such as "sewer" or "stormwater"/"drain").

In some embodiments, a combination of the above approaches is used.

It will be appreciated that examples above generally assume that a pipe inspection video makes use of a fixed camera angle, for example, a fixed-mount camera on a pipe inspection robot. However, in some embodiments, a pipe inspection robot has a camera that is configured to perform pan/tilt operations. There are a range of ways in which camera pan/tilt operations may be managed via the technology, for example, one or more of the following:

In some embodiments, camera angle is determined based on image processing techniques, for example, optical flow processing techniques (which may use inter-frame movement of identified image artefacts, for example, where artefact classification includes data representative of a region of a frame in which an artefact is identified) and/or frame-to-frame image comparison techniques such as Structural Similarity (SSIM) comparison processing techniques.

In some embodiments, certain frame processing techniques are only performed for frames having a prescribed camera angle (e.g., in a directly forward direction).

In some embodiments, image classifiers are trained to identify artefacts in pipes from a range of angles, such that artefacts are able to be classified regardless of camera angle.

In some embodiments, changes in camera angle without changes in chainage are identified and assist in deduplication.

In some embodiments, specific artefact identification and processing techniques are applied to deal with identification of start and end points of a pipe inspection. This is relevant for various reasons, which may include one or more of the following:

The video feed may include frames captured whilst a pipe inspection robot is lowered into a pipe, and/or raised out of a pipe.

As a pipe inspection robot approaches a pipe junction (for example, a T-junction), there will be video artefact peculiarities as the oncoming pipe will occupy an increasing proportion of image area.

Certain artefacts, for example, debris, may be present in sumps or the like that are present at the end of pipes but that do not form part of an inspection area.

In some embodiments, for end points this is achieved by training the image classification process to identify a plurality of pipe terminal artefacts, for example, including: (i) a grate or manhole cover; (ii) a terminal pit; (iii) a pipe-pipe junction; (iv) another form of pipe exit (such as an exit into a larger pipe). A preferred approach is as follows:

Classify artefacts in frames to the end of an inspection video.

Identify a final frame that includes a pipe terminal artefact—this could be regarded as a "terminal inspection frame."

Perform a cascading frame comparison process, wherein frames preceding the terminal inspection frame are compared to the terminal inspection frame (for example, using SSIM comparison or a machine learning model based comparison process as discussed further below).

Frames that have an above-threshold similarity to the terminal inspection frame are regarded as duplicates of the terminal inspection frame, and excluded.

For start points, some embodiments make use of a technique whereby the image classifier is trained to identify frames that show lowering of an inspection robot into a pipe, and these are excluded.

Example Manual Review User Interface

Figure 3:
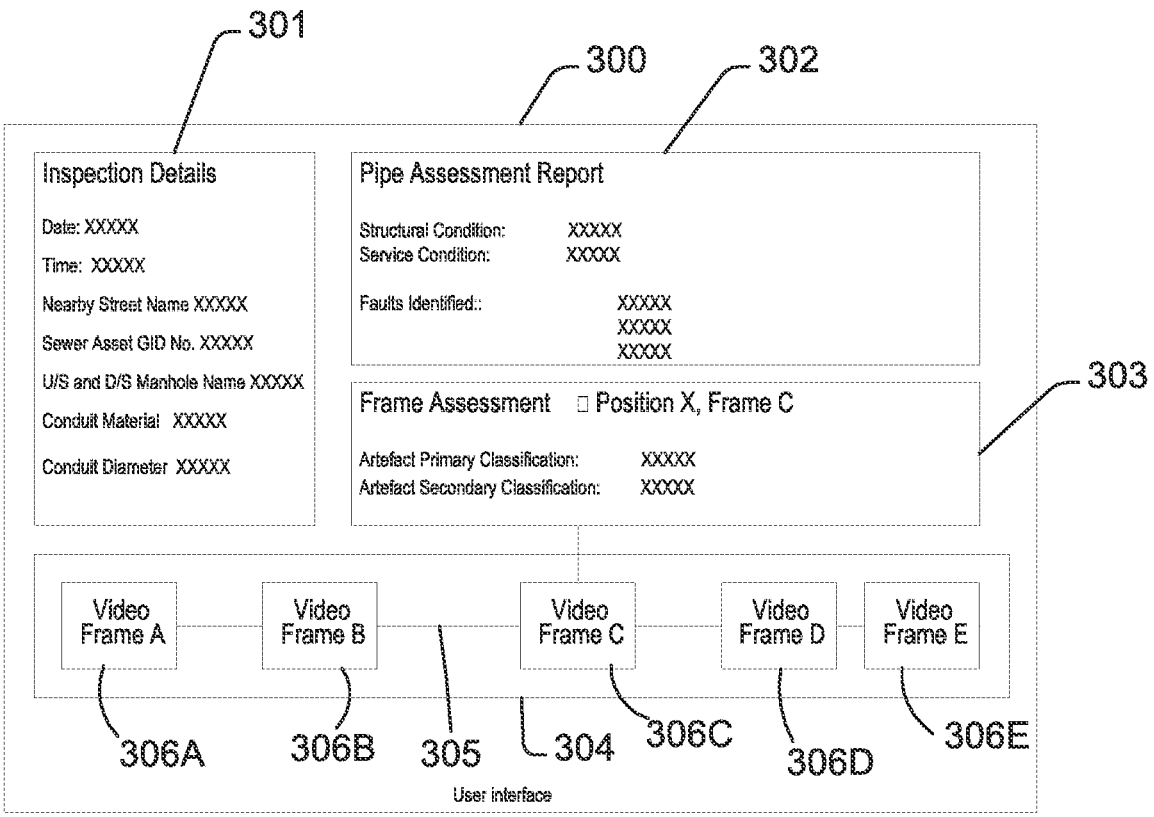
FIG. 3 illustrates an example user interface.

FIG. 3 illustrates an example user interface 300 configured to assist in manual review of artefact identification and deduplication.

A user interface object 301 provides inspection details, which are preferably extracted via OCR from a video overlay. A user is able to modify these to correct errors (for example, errors due to incorrect OCR extraction), and/or complete missing data fields.

User interface 300 includes an artefact selection object 304 that includes an axis line 305 representative of a length of pipe, with a plurality of sample video frames 306A to 306E positioned along the axis line (the axis line may extend off-screen and make use of a scroll bar or other GUI object to assist with navigation). These frames represent unique identified and categorized artefacts following deduplication. A user is able to select a given frame (e.g., frame 306C is selected in FIG. 3) and view classification details in a user interface object 303. In some cases the user is enabled to manually modify the classification (and identify if the artefact is a duplication that was not filtered out during the deduplication process). Modifications made to classifications are preferably used for model refinement.

In some embodiments, a user is able to additionally view other frames thereby to quickly visually scan for artefacts that were erroneously excluded during the deduplication process.

A user interface object 302 provides pipe assessment report details based on asset identification and classification, derived based on rules associated with a reporting standard (for example, WSA-05). This dynamically updates as a user manually alters artefact classifications.

In some embodiments, the user interface is configured to cause rendering of a two dimensional or three dimensional mapping interface, which presents pipe inspection report data in combination with GIS data. For example, via GIS data a user is able to view the location of pipes in a geographic area, and obtain inspection reports (and underlying data, for example, photos of identified issues) via navigation of the map interface.

In some embodiments, the system is configured to enable GIS integrations from customers to pinpoint GPS coordinates of defects. For example, GIS data is configured to maintain location information about manholes, and based on chainage or other position data an algorithm is configured to interpolate a map position for defects. This is optionally achieved by using geometry between the start and end points, plus distance travelled to a defect.

In some embodiments, the system is configured to export information in a GIS compatible format, thereby to allow for presentation of pipe inspection data via a third-party GIS software platform.

In some embodiments, a process is configured thereby to define pipe maintenance recommendations based on: (i) defects determined based on artefact identification as described above; and (ii) business logic. For example: if "surface damage" present, suggest "re-line the pipe"; if "collapsed" present, suggest "dig up and lay a new pipe," etc. In some embodiments, based off of recommendations, the system may calculate estimated pricing for remediation actions, for example, to assist in budgeting for maintenance across a pipe infrastructure network. The business rules may also be configured to generate a priority report for remediation actions for each organization's pipes, and/or predict future failure events or timeframes.

Example Methods

Figure 2A:
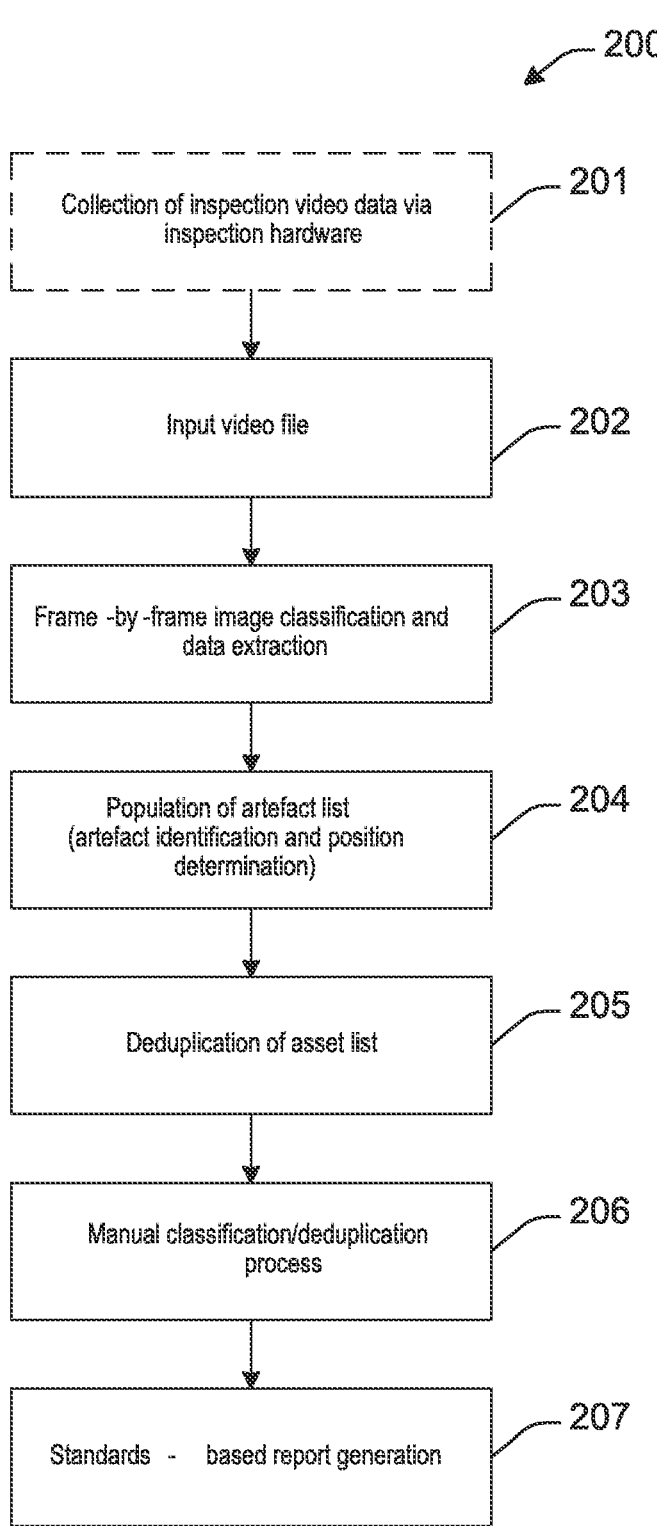
FIG. 2A illustrates a method according to one embodiment.

FIG. 2A illustrates a method 200 according to one embodiment.

Block 201 represents a physical inspection process of a pipe, conducted using inspection hardware such as a pipe inspection robot (sometimes referred to as a "crawler"). This results in generation of a video file with overlays representative of inspection attributes (for example, a static overlay provided over a selection of frames at or proximal video commencement) and chainage measurement (for example, a dynamic overlay provided over all or substantially all frames, which is dynamically varied based on distance from manhole).

Block 202 represents input to an analysis system of a video file collected from the inspection as represented by block 201. This is subjected to a frame-by-frame image classification and data extraction process. An example of this process is provided by method 210 of FIG. 2B. In that method, block 211 represents commencement of frame processing. At block 212, a primary classification model is used to determine a primary artefact classification for the frame (or, in some embodiments, multiple primary classifications) at block 213. Block 214 represents a process including executing processing via second tier classification model associated with each identified primary artefact category, resulting in identification of secondary classifications at block 215. For frames where primary classification triggers an OCR process, OCR is performed at block 216. Block 217 represents a process whereby artefact data sets are defined, including classification and position. These artefact data sets are added to an artefact database at block 218.

Figure 2C:
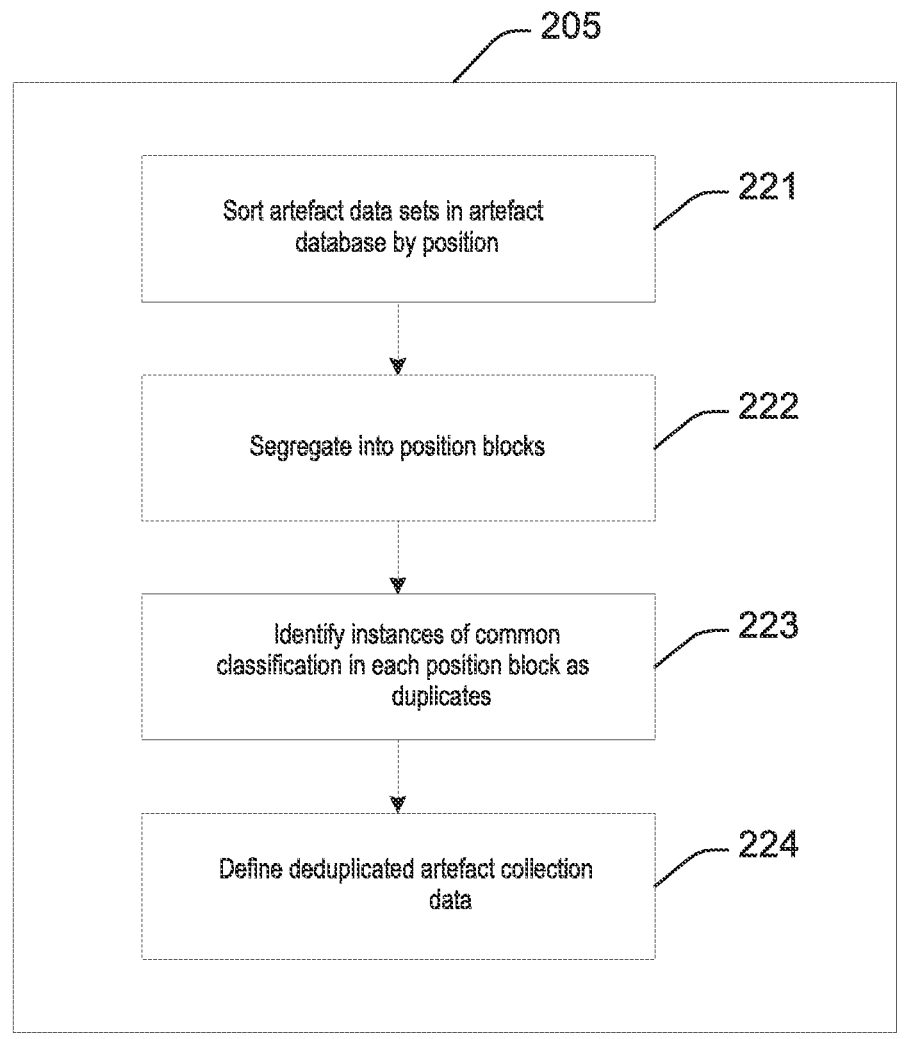
FIG. 2C illustrates a method according to one embodiment.

Returning method 200 of FIG. 2A, at block 204 an artefact list is defined for the pipe inspection, including classification and position. This is then subjected to a deduplication process at block 205. An example of the process of block 205 is shown in FIG. 2C. This method includes sorting artefact data sets by position (block 221), segregation into position blocks (for example, blocks of between 100 mm and 500 mm) (block 222), identification of common classifications within each block, which are assumed to represent duplications (block 223), and output of a deduplicated set of artefacts (block 224).

Block 206 represents a manual classification and deduplication review process, for example, achieved by a user interface as shown in FIG. 3. This then allows for generation of a report based on a predefined reporting standard (block 207), such as WSA-05.

Figure 4:
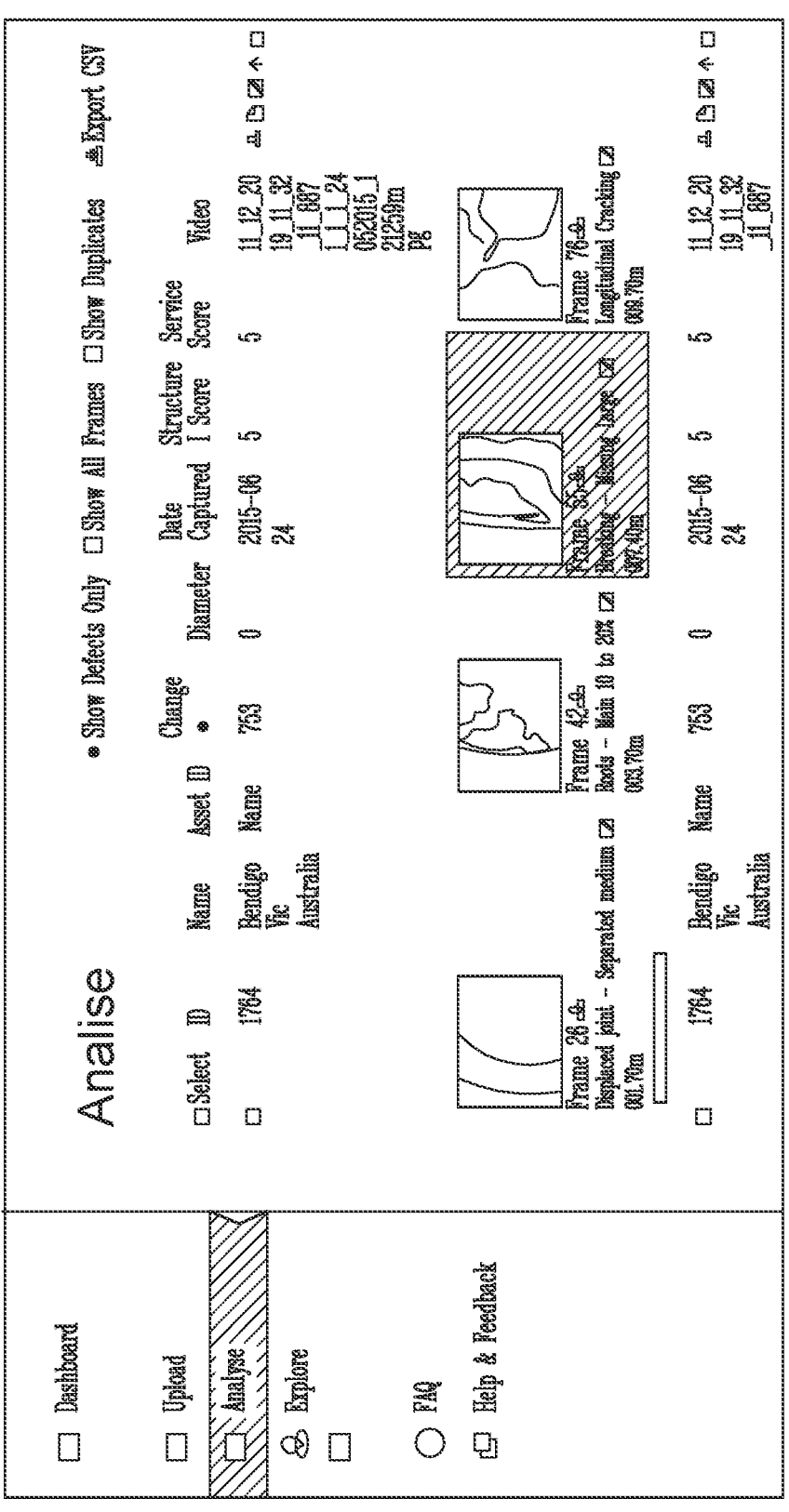
FIG. 4 provides an example user interface screenshot.

FIG. 4 provides an example screenshot according to one embodiment. In this screenshot, a side-scrolling user interface object allows a user to navigate de-duplicated frames in which defects have been identified. A user interface object also allows for duplicates to be shown if desired. This allows a user to quickly review the contents of a pipe in a linear manner and confirm that predictions made via image classification are accurate.

Figure 5:
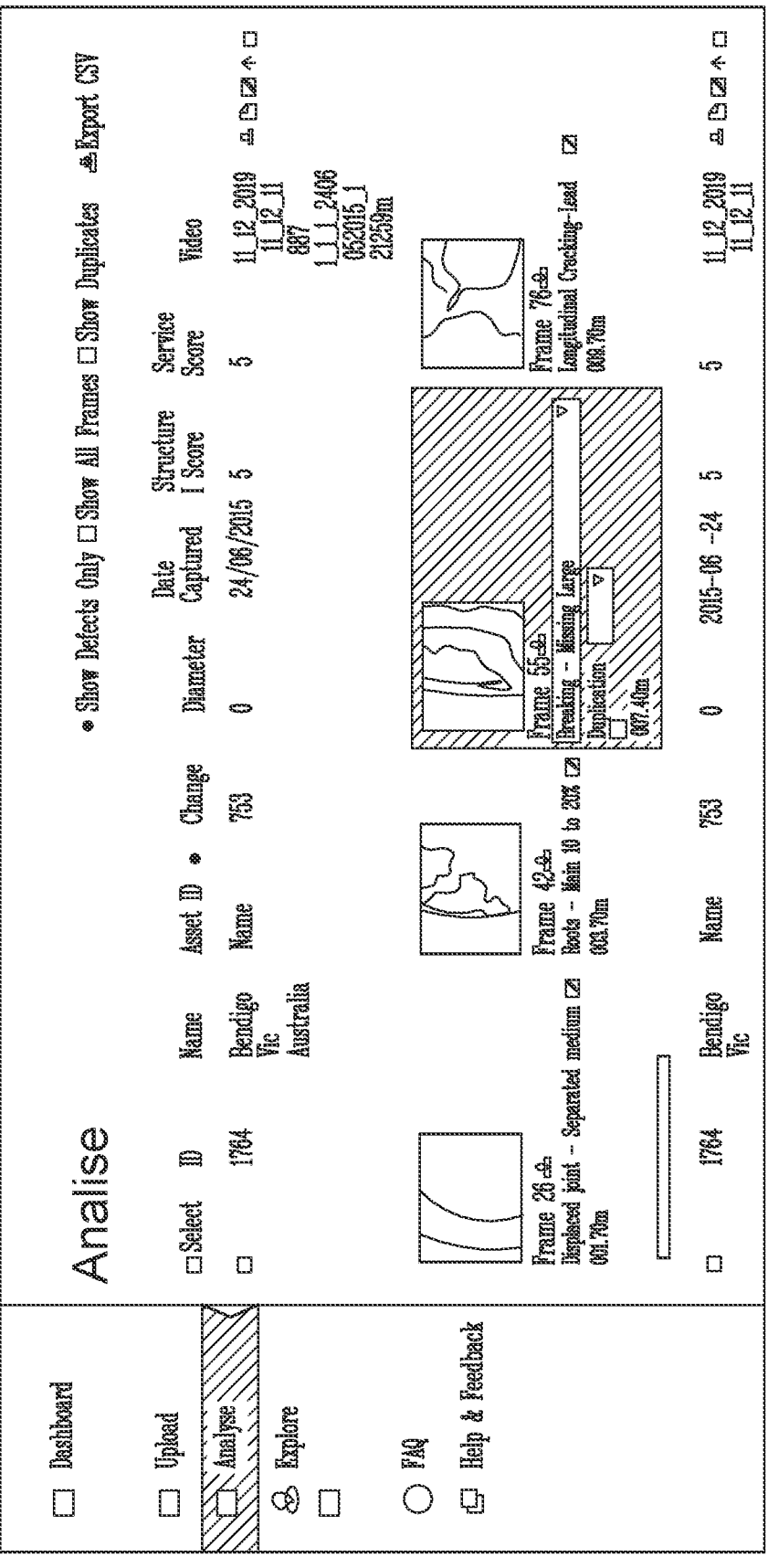
FIG. 5 provides an example user interface screenshot.

FIG. 5 provides another screenshot, similar to that of FIG. 4, but with functionality to amend details. For example, the amending may include altering a defect classification from a dropdown menu (this may be used to optimize classifier algorithms), and identify duplicates that were not autonomously removed via the deduplication process.

Figure 6:
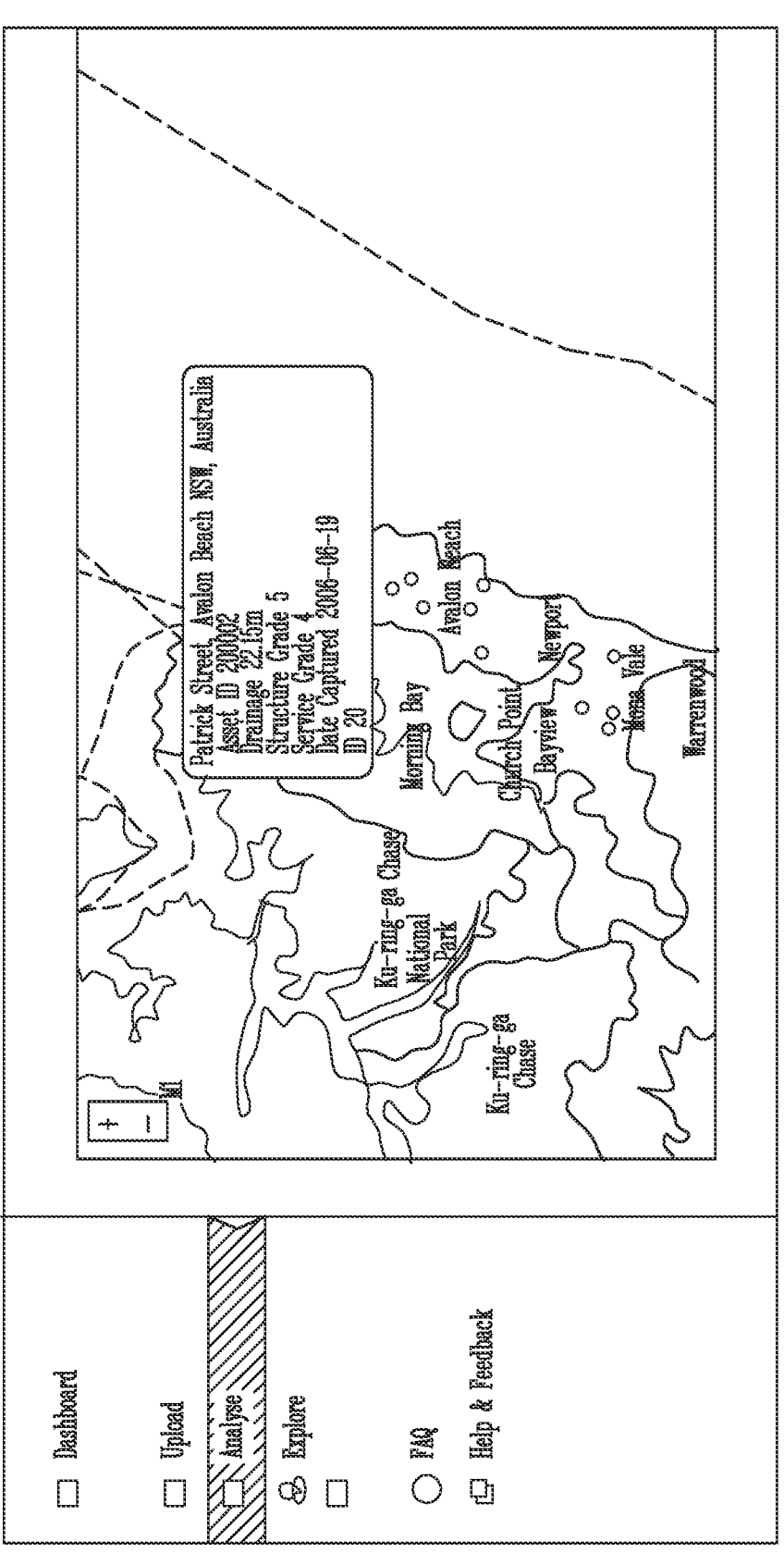
FIG. 6 provides an example user interface screenshot.

FIG. 6 provides a further example screenshot according to one embodiment. In this example, locations of assets are shown on a map, and these are used to access inspection data and videos via the "analysis" screens of FIG. 4 or FIG. 5.

Water Level Analysis Via Computer Vision

In some embodiments, a further category of image processing is applied thereby to extract information relevant to water levels in a pipe. Water level data is in this manner able to be defined relative to the same position measurements used for artefacts above, thereby to enable correlation between artefacts and water levels. This may be used, in some embodiments, to assist in identification of pipe conditions (for example, to infer blockages, and/or make a pipe condition assessment based on the presence/absence of blockages affecting water flow). In some embodiments, this processing is used for the purposes of generating hydraulic grade line information.

An example of water level analysis, according to one embodiment, is explained below.

In this embodiment, each of a sampling of video frames are processed, for example, the same sampling of video frames processed in the frame-by-frame image classification and data extraction for block 203 in FIG. 2A. For each frame, a computer vision process is applied, this being a computer vision process configured to enable identification of a pipe joint. Pipe joints have quite distinctive attributes, which renders them as suitable targets for identification via known computer vision techniques. A preferred approach is to use a Hough transform thereby to identify circular arte-facts.

Based on a computer vision identification of a joint, a process is performed thereby to determine a water level at the joint. This is achieved by, in essence, comparing the identified joint to a full circle. It will be appreciated that, as water level rises, a chord is cut across a circle at a higher point. This allows for a relativistic (e.g., percentage) calcu-lation of, for example, distance from pipe top to chord center (i.e., vertical measurement) relative to pipe diameter (i.e., horizontal measurement). This provides, at each joint, a relative measurement representative of water level. In one example, this is calculated as: (height/(width minus height)), expressed as a percentage. It will be appreciated that this percentage represents a percentage of the pipe that is filled with water. It will be appreciated that this assumes water level remains under 50%; in the event that water level is over 50% there would be inherent problems in operating a pipe inspection robot.

Based on % water level determinations at each joint, and identification of location of individual joints (which may be achieved be artefact extraction and deduplication, as described above), the system generates a data table of water level as a function of position in pipe. This is optionally rendered by the user interface as a graph or other visual object, which may include a diagram representing hydraulic grade line.

An example process includes:

Accessing a next frame for processing.

Applying image processing techniques, for example, a Hough transform, thereby to identify pipe joints based on circular attributes. This optionally includes image pre-processing for Hough transform optimization.

Repeating this process for all or a sampled subset of frames.

Performing a frame comparison process, whereby frames are compared to adjacent/proximal frames (optionally using frames on a modified state from the Hough transform step), for example, using a SSIM process or other comparison technique, thereby to identify unique joints (i.e., another deduplication process). In some examples, frames in which multiple joints are identified are excluded.

For each unique joint, performing an analysis process thereby to determine water level (for example, based on a "missing portion of circle" process, such as a height-to-width process as discussed above).

Populate a data table that correlates water level values with position values (for example, position is deter-mined from chainage or the like, as discussed above, which may include OCR of chainage values present on video frames).

Make this data table available to a GUI component that renders data representative of pipe water levels (for example, as a graph).

Optionally: infer potential blockage locations based on variations in water level.

It will be appreciated that this water level process may in some cases be implemented independently of pipe artefact classification.

In a further example process, water level detection is achieved as follows:

Accessing a next frame for processing.

Measuring the similarity of the current frame with a previous (e.g., adjacent) frame, for example, using SSIM similarity measurement. If the current frame is different (e.g., threshold SSIM value) from the previous frame, it is passed to a joint detection module.

Figure 8A:
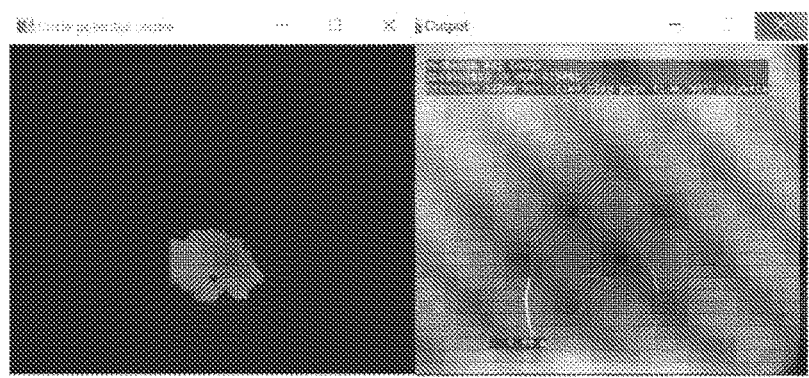
FIG. 8A to FIG. 8F provide context to a water level estimation process.

In the joint detection module, the first task is to find the center of the pipe. One approach is to a software solution such as Opencv, edge detection and morpho-logical operations. A function is used to detect the potential circle center point for the pipe. A graphical example is shown in FIG. 8A.

Figure 8B:
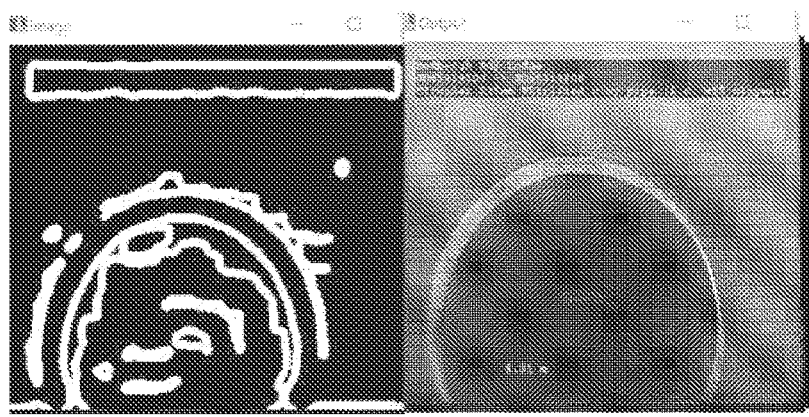

The next task is to search for an exact parameter of a potential joint surrounding the possible center. This makes use of a potential joint finder function, which utilizes morphological operations to find edges and filter them by considering existing domain knowledge. An example of the result of edge detection is shown in FIG. 8B.

Next, a joint finder function is used to find a joint with its corresponding center and radius. Then, process searches for finding a best matched circle within the edge images. This is achieved by applying a Hough circle finder function (for example, as available via Opencv) to estimate the exact center and the radius in the joint area. Thus, the output could be the potential center coordination, its corresponding radius, and a joint flag.

Figure 8C:
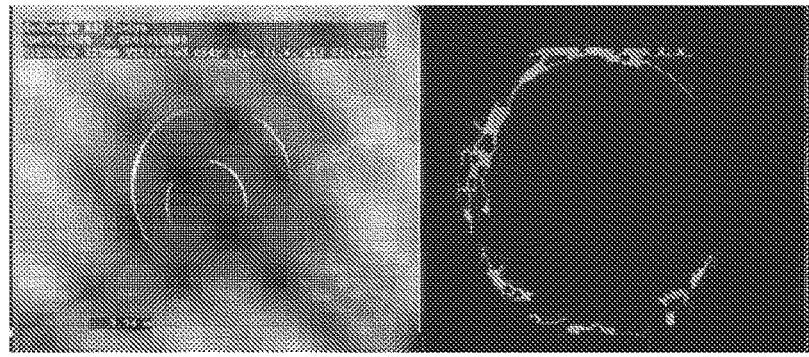
Figure 8D:
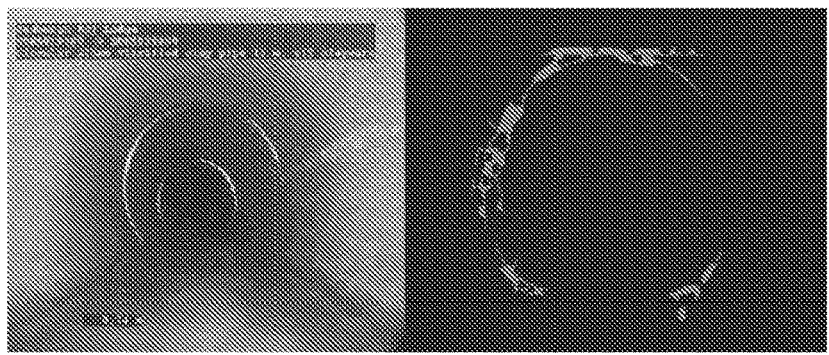

After this, the process turns to estimating water-level in the joint location, to accomplish this, the process first filters the edges on the circle boundary area with considering the radius of potential joint point and connected components. The output of this part should be a circle that illustrates the joint area. Thus, with having the likely circle edges, the projections from the center of the joint can be measured. This is done by drawing a line from the center to the edge of the potential joint. A potential output for this step is shown in FIG. 8C. As noted above, the first main step in this function is to find the connected components by con-sidering the potential center and its corresponding radius. Water level is detected using existing domain knowledge that, for example, should be a horizontal line edge on the water area. Thus, if the process is to remove them, it can estimate the water level more accurately (see FIG. 8D as an example).

Figure 8E:
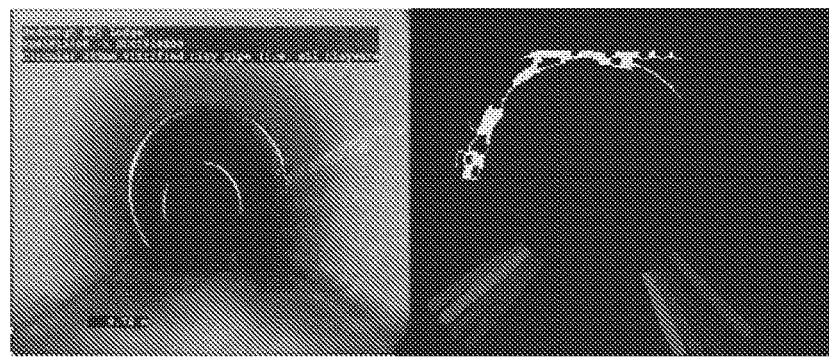

Then, in the next stage, the process performs a projection from the center of circle to find the intersections with the edges. These projections are done with one degree interval for the whole area in the bottom half of the edge image. The results of projected lines are shown in FIG. 8E.

Figure 8F:
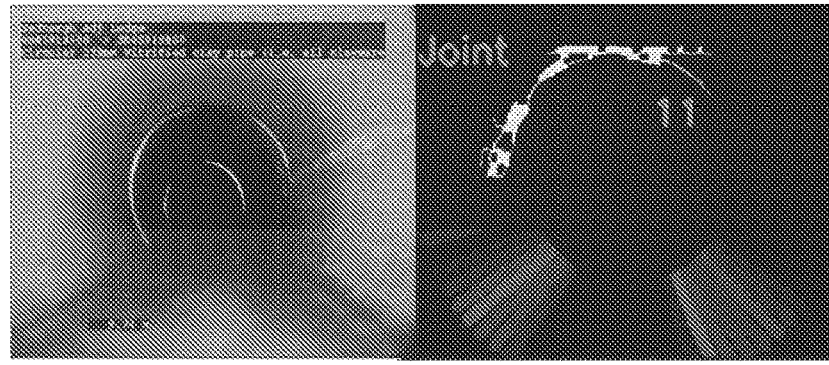

If a vertical line is drawn from the center of circle to the bottom of the circle, this would provide for two invis-ible segments, left hand side and right hand side. This allows identification of areas that are non-zero projec-tion in the left and right hand sides of the projection image. By selecting a minimum of degree change from the left and right sides, and doubling that value, that finds the degree for the water level area. Then, a percentage calculation function is used to estimate the water level in the joint point within the pipe (see FIG. 8F).

It will be appreciated that the above method may be summarized as: inputting a next frame; performing a similarity check; finding a potential circle center; performing a morphological operation to find a joint point; finding edges; finding the connected component and filtering horizontal ones; finding the circle center and radius; performing a projection to find water level; and finally outputting a water level estimation.

Enhanced De-Duplication Process, Including Use of Machine Learning Model

In some embodiments, deduplication as described above is enhanced by (and/or optionally replaced by) a frame-to-frame comparison process. This frame-to frame comparison process may be based on either:

A weighted comparison algorithm, which produces a similarity score; or

A machine learning model (MLM) that is trained on existing image pairs labelled as "duplicates" or "non-duplicates."

The MLM example is considered below; a person skilled in the art will readily recognize how a MLM can be replaced by an algorithm with set weightings.

In a preferred embodiment, a plurality of data attributes for each frame are used for the purposes of frame similarity comparison. These include image data (e.g., image pixel values), and chainage (i.e., position in pipe when frame is captured). Further attributes are also used thereby to improve tailoring of the comparison algorithms, for example, pipe diameter and/or pipe class (e.g., stormwater or sewer, and pipe material). It will be appreciated that these further attributes are common between both frames. However, these are relevant in a practical sense as they affect a distance that a pipe inspection robot can see down a pipe.

For the purposes of comparison, in some embodiments, images are compared based on a known image comparison algorithm, for example, structural similarity (SSIM), thereby to obtain an image similarity score representative of image comparison.

In a preferred embodiment, a statistical MLM is configured to receive the following data for a pair of frames (referred to as a first and second frame):

A value representative of image similarity between the first frame and the second frame, for example, an output of a SSIM process.

A value representative of capture point separation, for example, derived from comparison of chainage measurements for each of the first and second frame.

A numerical value representative of a primary (and optionally secondary) artefact identified via the classification process for the first frame (e.g., a numerical value is assigned to artefacts such as "cracking," "breaking," and so on).

A numerical value representative of a primary (and optionally secondary) artefact identified via the classification process for the second frame.

Values representative of pipe attributes, for example, one or more of: pipe diameter; pipe class (e.g., stormwater or sewer); pipe material, etc. It will be appreciated that this is only required if the MLM is being used for analysis of pipes having different attributes; if all pipes are the same in all cases, then this is not required.

In some embodiments, additional values are also considered, for example, a value representing a difference in camera angle.

In the case of MLM training, each pair of images is labelled as a "duplicate frames" or "non-duplicate frames." Once trained, this allows the MLM to predict (optionally with a confidence rating) whether a pair of frames are "duplicate frames" or "non-duplicate frames."

This MLM is optionally trained based on data derived via a de-duplication process such as that of FIG. 2C. That is, based on historical data from operation of a system using a de-duplication process such as that of FIG. 2C (preferably, with some manual review based on used interactions with the system as described above), there is a library of labelled frame comparison data (frames that have been found to contain only duplicate artefacts are labelled as "duplicates" or "threshold similarity," frames that have not been found to contain only duplicate artefacts are labelled as "non-duplicates" or "below threshold similarity.") Training may include executing an algorithm to extract pairs of frame data sets from a database (e.g., database 130), with each pair being known to be "duplicates" or "non-duplicates," with each data set including: (i) an image; (ii) a chainage value (or other position value); and (iii) one or more additional attributes required by the MLM such as primary/secondary artefact, pipe class and pipe diameter.

Once trained, the MLM may be used to replace or supplement the de-duplication process of FIG. 2C. In some embodiments, a system is configured to use a MLM from the outset (for example, a MLM trained using manually labelled data sets).

Example Computer System

Figure 7:
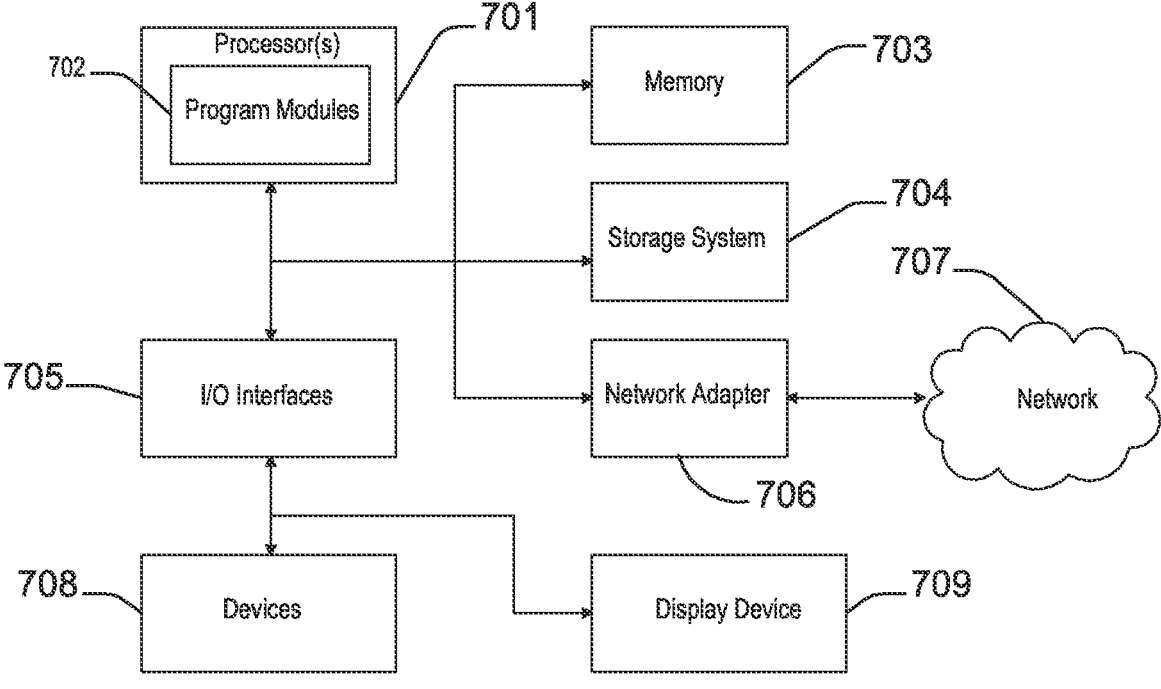
FIG. 7 illustrates an example computing system.

FIG. 7 illustrates an example computer or processing system that may implement any portion systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of a computer system may include, but are not limited to, one or more processors or processing units

701, a system memory 703, and a bus 705 that couples various system components including system memory 703 to processor 701. The processor 701 may include a software module 702 that performs the methods described herein. The module 702 may be programmed into the integrated circuits of the processor 701, or loaded from memory 703, storage device 704, or network 707 or combinations thereof.

Bus 705 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by the computer system, and it may include both volatile and non-volatile media, removable and non-removable media.

System memory 703 can include computer system readable media in the form of volatile memory, such as random access memory (RAM) and/or cache memory or others. The computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 705 by one or more data media interfaces.

The computer system may also communicate with one or more external devices 708 such as a keyboard, a pointing device, a display 709, etc.; one or more devices that enable a user to interact with a computer system; and/or any devices (e.g., network card, modem, etc.) that enable a computer system to communicate with one or more other computing devices. Such communication can occur via Input/Output (I/O) interfaces 705.

Still yet, a computer system can communicate with one or more networks 707 such as a local area network (LAN), a general wide area network (WAN), and/or a public network (e.g., the Internet) via network adapter 706. As depicted, network adapter 706 communicates with the other components of a computer system via bus 705. It should be understood that although not shown, other hardware and/or software components could be used in conjunction with a computer system. Examples include, but are not limited to: microcode, device drivers, redundant processing units, external disk drive arrays, RAID systems, tape drives, and data archival storage systems, etc.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code that comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and that-when loaded in a computer system-is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present disclosure may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present disclosure may include and may be included within fixed and portable devices such as desktop, laptop, and/or server. A module may be a component of a device, software, program, or system that implements some "functionality," which can be embodied as software, hardware, firmware, electronic circuitry, or etc.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments, but only by the scope of the accompanying claims.

It should be appreciated that in the above description of exemplary embodiments of the present disclosure, various features of the present disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed present disclosure requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this present disclosure.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the present disclosure.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B that may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the present disclosure.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B that may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The invention claimed is:

1. A computer implemented method configured to facilitate maintenance of pipe infrastructure for a pipe infrastructure network, the method including:

performing a data ingestion and processing method for a plurality of locations within the pipe infrastructure network, wherein each data ingestion and processing method includes:

receiving input video data defining a pipe inspection video collected via pipe inspection infrastructure for a defined pipe at a defined location within the pipe infrastructure network;

for each frame in a subset of frames defined in the video data:

(i) processing the frame via one or more image classification models, thereby to identify presence of one or more artefacts belonging to a defined set of pipe condition artefact classifications;

(ii) determining position data associated with the frame; and (iii) defining, for each identified artefact, an artefact data set representative of a combination of a position and an artefact classification;

executing a duplication identification process configured to identify artefact data sets having combinations of position and an artefact classification from distinct frames that are predicted to represent a common real-world artefact in the pipe; and outputting pipe condition data derived from the deduplicated artefact data;

compiling the pipe condition data for the plurality of locations within the pipe infrastructure network into a pipe network artefact data repository; and executing processing in respect of the pipe network artefact data repository thereby to autonomously define maintenance facilitation data including one or more of the following:

(i) a report which includes prioritization of recommended pipe maintenance remediation actions across the pipe infrastructure network;

(ii) a report which includes budgeting information of recommended pipe maintenance remediation actions across the pipe infrastructure network; and (iii) a report which predicts future failure events or timeframes across the pipe infrastructure network.

2. The method of claim 1, wherein processing the frame via one or more image classification modules, thereby to identify presence of one or more pipe condition artefacts belonging to a defined set of pipe condition artefact classifications includes:

(i) processing the frame via a primary classification model, thereby to identify one or more artefact categories; and (ii) for each identified artefact category having an associated secondary classification model, executing the associated secondary classification model thereby to determine an artefact classification.

3. The method of claim 2, further comprising, for each identified artefact category without an associated secondary classification model, determining an artefact classification based on the primary classification model.

4. The method of claim 1, wherein the defined set of pipe condition artefact classifications includes one or more pipe condition artefact classifications associated with an OCR extraction trigger, and wherein for each identified artefact having a classification associated with the OCR extraction trigger, the method includes performing an OCR extraction of text data from the video frame.

5. The method of claim 4, wherein the text data includes a positional measurement.

6. The method of claim 5, wherein the positional measurement is used to determine the positioning data associated with the frame.

7. The method of claim 4, wherein the text data includes data describing the defined pipe and/or pipe location.

8. The method of claim 1, further comprising extracting positional measurement data from a data file associated with the video data, wherein the data file associates video timecodes and/or frames with positional data.

9. The method of claim 1, wherein the duplication identification process configured to identify combinations of position and an artefact classification from distinct frames that are predicted to represent a common real-world artefact in the pipe includes:

(i) sorting artefact data sets based on their positional information; and (ii) identifying as duplicates artefact data sets having (A) a common artefact classification; and (B) positional information within a threshold range.

10. The method of claim 1, wherein the duplication identification process configured to identify combinations of position and an artefact classification from distinct frames that are predicted to represent a common real-world artefact in the pipe includes:

(i) sorting artefact data sets based on their positional information;

(ii) segregating the artefact data sets into blocks of a predefined distance based on the positional information; and (iii) identifying as duplicates artefact data sets having (A) a common artefact classification; and (B) segregation into a common block.

11. The method of claim 10, wherein the predefined distance is between 100 mm and 500 mm.

12. The method of claim 1, wherein the duplication identification process includes a frame-to-frame comparison process that uses: (i) image similarity; (ii) relative capture positions; and (iii) artefact classification data for each frame.

13. The method of claim 12, wherein the image similarity uses a structural similarity (SSIM) comparison process.

14. The method of claim 12, wherein the frame-to-frame comparison process uses a trained machine learning model.

15. The method of claim 1, further comprising enabling accessing by a user of a user interface that is configured to enable a user to manually review and adjust artefact classifications by reference to display of relevant video frames.

16. The method of claim 1, further comprising outputting reporting data for the pipe in accordance with a predefined reporting standard.

17. The method of claim 1, wherein determining position data associated with a given frame includes performing an OCR extraction of position data superimposed on the frame.

18. The method of claim 17, wherein the position data is a relative position based on a start point.

19. The method of claim 1, wherein determining position data associated with a given frame includes performing a simultaneous location and mapping (SLAM) process.

20. The method of claim 1, wherein determining position data associated with a given frame includes performing a position tracking process based on image processing techniques.

21. The method of claim 1, wherein determining position data associated with a given frame includes performing a position tracking process based on an optical flow method.

22. The method of claim 1, further comprising for each frame in the subset or another subset of frames defined in the video data, processing the frame via a computer vision technique thereby to identify a pipe joint; and for each joint identified in the pipe: determining a water level at the joint.

23. The method of claim 22, wherein the processing the frame via a computer vision technique thereby to identify a pipe joint includes applying a computer vision technique configured to identify partial circles.

24. The method of claim 23, wherein the computer vision technique configured to identify partial circles includes a Hough transform.

25. The method of claim 23, wherein identifying water level at the joint is based upon analysis of attributes of the partial circle.

26. The method of claim 23, wherein identifying water level at the joint is based upon analysis of a height of the pipe for which the joint is not visible.

27. The method of claim 23, wherein identifying water level at the joint is based upon analysis of a comparison between width of the identified partial circle and height of the identified partial circle, with the difference between width and height representing a height defining predicted water level.

28. The method of claim 22, further comprising applying a deduplication process thereby to identify frames showing common joints thereby to enable identification of unique joints.

29. The method of claim 28, wherein the deduplication process includes an image similarity comparison process.

30. The method according to claim 1 wherein the maintenance facilitation data includes two or more of the following:

(i) a report which includes prioritization of recommended pipe maintenance remediation actions across the pipe infrastructure network;

(ii) a report which includes budgeting information of recommended pipe maintenance remediation actions across the pipe infrastructure network; and (iii) a report which predicts future failure events or timeframes across the pipe infrastructure network.

31. The method according to claim 1 wherein the maintenance facilitation data includes a report which includes prioritization of recommended pipe maintenance remediation actions across the pipe infrastructure network.

\* \* \* \* \*